(12) United States Patent
Benedetto

(10) Patent No.: US 12,383,824 B2
(45) Date of Patent: Aug. 12, 2025

(54) MULTI-USER CROSS-DEVICE SYNCHRONIZATION OF METAVERSE INSTANTIATION

(71) Applicant: Sony Interactive Entertainment Inc., Tokyo (JP)

(72) Inventor: Warren Benedetto, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 186 days.

(21) Appl. No.: 17/879,618

(22) Filed: Aug. 2, 2022

(65) Prior Publication Data

US 2024/0042313 A1 Feb. 8, 2024

(51) Int. Cl.
| | | |
|---|---|---|
| A63F 13/352 | (2014.01) | |
| A63F 13/335 | (2014.01) | |
| A63F 13/48 | (2014.01) | |

(52) U.S. Cl.
CPC .......... *A63F 13/352* (2014.09); *A63F 13/335* (2014.09); *A63F 13/48* (2014.09)

(58) Field of Classification Search
CPC .................................................... A63F 13/352
See application file for complete search history.

(56) References Cited

U.S. PATENT DOCUMENTS

| | | | | |
|---|---|---|---|---|
| 2002/0142842 | A1* | 10/2002 | Easley | ................. A63F 13/335 463/42 |
| 2007/0060363 | A1 | 3/2007 | Nguyen et al. | |
| 2012/0283018 | A1 | 11/2012 | Berner et al. | |
| 2014/0057722 | A1 | 2/2014 | Justice et al. | |
| 2014/0082526 | A1* | 3/2014 | Park | ...................... H04L 65/403 715/757 |
| 2018/0001216 | A1 | 1/2018 | Bruzzo et al. | |
| 2018/0028912 | A1* | 2/2018 | Campbell | ............... A63F 13/31 |
| 2020/0222802 | A1 | 7/2020 | Sherwani et al. | |
| 2021/0339149 | A1 | 11/2021 | McCoy et al. | |
| 2022/0040573 | A1* | 2/2022 | Fear | ...................... A63F 13/358 |

FOREIGN PATENT DOCUMENTS

CN 112999651 A 6/2021

OTHER PUBLICATIONS

Intl Preliminary Report & Written Opinion PCT/US2023/070232, dated Oct. 11, 2023, total 14 pages.

* cited by examiner

*Primary Examiner* — Jay Trent Liddle
(74) *Attorney, Agent, or Firm* — Kilpatrick Townsend & Stockton LLP

(57) ABSTRACT

A method including receiving a request to establish a multi-player session for users to enable participation in a metaverse. The method including determining whether an application generating the metaverse is installed on local devices of the users selected for participation in the metaverse by the users. The method including launching a corresponding local instance of the application when the application is installed on a corresponding local device. The method including launching a corresponding cloud instance of the application on a cloud based streaming server when the application is not installed on the corresponding local device. The method including determining that each instance of the application for the users has been launched, wherein each instance for the users is a local instance or a cloud instance. The method including enabling a start of the multi-player session when the instances of the application for the users has been launched.

20 Claims, 5 Drawing Sheets

MULTI-USER CROSS-DEVICE SYNCHRONIZATION OF METAVERSE INSTANTIATION

TECHNICAL FIELD

The present disclosure is related to gaming, and more specifically to the supervision of computing devices available to users and the applications installed on those devices in order to facilitate loading of instances of an application locally or at a cloud based streaming server for use by a group of users in a multi-player session. Also, artificial intelligence models can be built for users so that a recommendation for an application may be provided to the group of users for participating in a multi-player session at a particular point in time.

BACKGROUND OF THE DISCLOSURE

Video games and/or gaming applications and their related industries (e.g., video gaming) are extremely popular and represent a large percentage of the worldwide entertainment market. Video games are played anywhere and at any time using various types of platforms, including gaming consoles, desktop or laptop computers, mobile phones, etc.

Users expect an immersive social experience that can encompass one or more metaverses with seamless transfer between virtual environments. For example, a group of users that are playing together in one virtual environment of an application may want to transfer their combined social experience to another virtual environment of another application (i.e., begin playing together in a new virtual environment). The application should be executable across different platforms of devices currently in use by the group of users. However, problems may occur when current devices of some users in the group cannot install or do not have the application installed on the local device to give the best user experience. Affected users have to wait for the application to install on their devices and then connect up with their friends. Because this install process may last a long period of time (e.g., more than 10 to 20 minutes), the movement between virtual environments by the group of users would be incomplete and interrupted. That is the immersive social experience would be broken by the abruptness of reality as some users would be left out of the new virtual environment and the interactions conducted within that new virtual environment.

It is in this context that embodiments of the disclosure arise.

SUMMARY

Embodiments of the present disclosure relate to a backend server supervisor configured for monitoring and supervising computing devices of users to determine which applications are locally installed on which devices of users. In that manner, when a group of players wish to participate together in a virtual world or metaverse, such as one created by an application, in a multi-player session, the supervisor can facilitate that participation by launching local instances of locally installed applications on corresponding devices and/or launching cloud instances of the application for users whose devices do not have the application locally installed. Thereafter, the supervisor may coordinate the initiation and management of the multi-player session to enable participation by the group of users in the virtual world or metaverse of the application.

In one embodiment, a method is disclosed. The method including generating game state data during execution of a video game for a game play of a player. The method including receiving over a network a request to establish a multi-player session for a plurality of users to enable participation in a metaverse. The method including determining whether an application configured to generate the metaverse is installed on a plurality of local devices of the plurality of users selected for the participation in the metaverse by the plurality of users. The method including launching a corresponding local instance of the application on a corresponding local device when the application is installed on the corresponding local device. The method including launching a corresponding cloud instance of the application on a cloud based streaming server when the application is not installed on the corresponding local device. The method including determining that each of a plurality of instances of the application for the plurality of users has been launched, wherein the each of the plurality of instances is a local instance or a cloud instance. The method including enabling a start of the multi-player session when the each of the plurality of instances of the application for the plurality of users has been launched.

In another embodiment, a non-transitory computer-readable medium storing a computer program for implementing a method is disclosed. The computer-readable medium including program instructions for receiving over a network a request to establish a multi-player session for a plurality of users to enable participation in a metaverse. The computer-readable medium including program instructions for determining whether an application configured to generate the metaverse is installed on a plurality of local devices of the plurality of users selected for the participation in the metaverse by the plurality of users. The computer-readable medium including program instructions for launching a corresponding local instance of the application on a corresponding local device when the application is installed on the corresponding local device. The computer-readable medium including program instructions for launching a corresponding cloud instance of the application on a cloud based streaming server when the application is not installed on the corresponding local device. The computer-readable medium including program instructions for determining that each of a plurality of instances of the application for the plurality of users has been launched, wherein the each of the plurality of instances is a local instance or a cloud instance. The computer-readable medium including program instructions for enabling a start of the multi-player session when the each of the plurality of instances of the application for the plurality of users has been launched.

In still another embodiment, a computer system is disclosed, wherein the computer system includes a processor and memory coupled to the processor and having stored therein instructions that, if executed by the computer system, cause the computer system to execute a method. The method including receiving over a network a request to establish a multi-player session for a plurality of users to enable participation in a metaverse. The method including determining whether an application configured to generate the metaverse is installed on a plurality of local devices of the plurality of users selected for the participation in the metaverse by the plurality of users. The method including launching a corresponding local instance of the application on a corresponding local device when the application is installed on the corresponding local device. The method including launching a corresponding cloud instance of the application on a cloud based streaming server when the application is not installed on the corresponding local device. The method including determining that each of a plurality of instances of the application for the plurality of users has been launched, wherein the each of the plurality of instances is a local instance or a cloud instance. The method including enabling a start of the multi-player session when the each of the plurality of instances of the application for the plurality of users has been launched.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
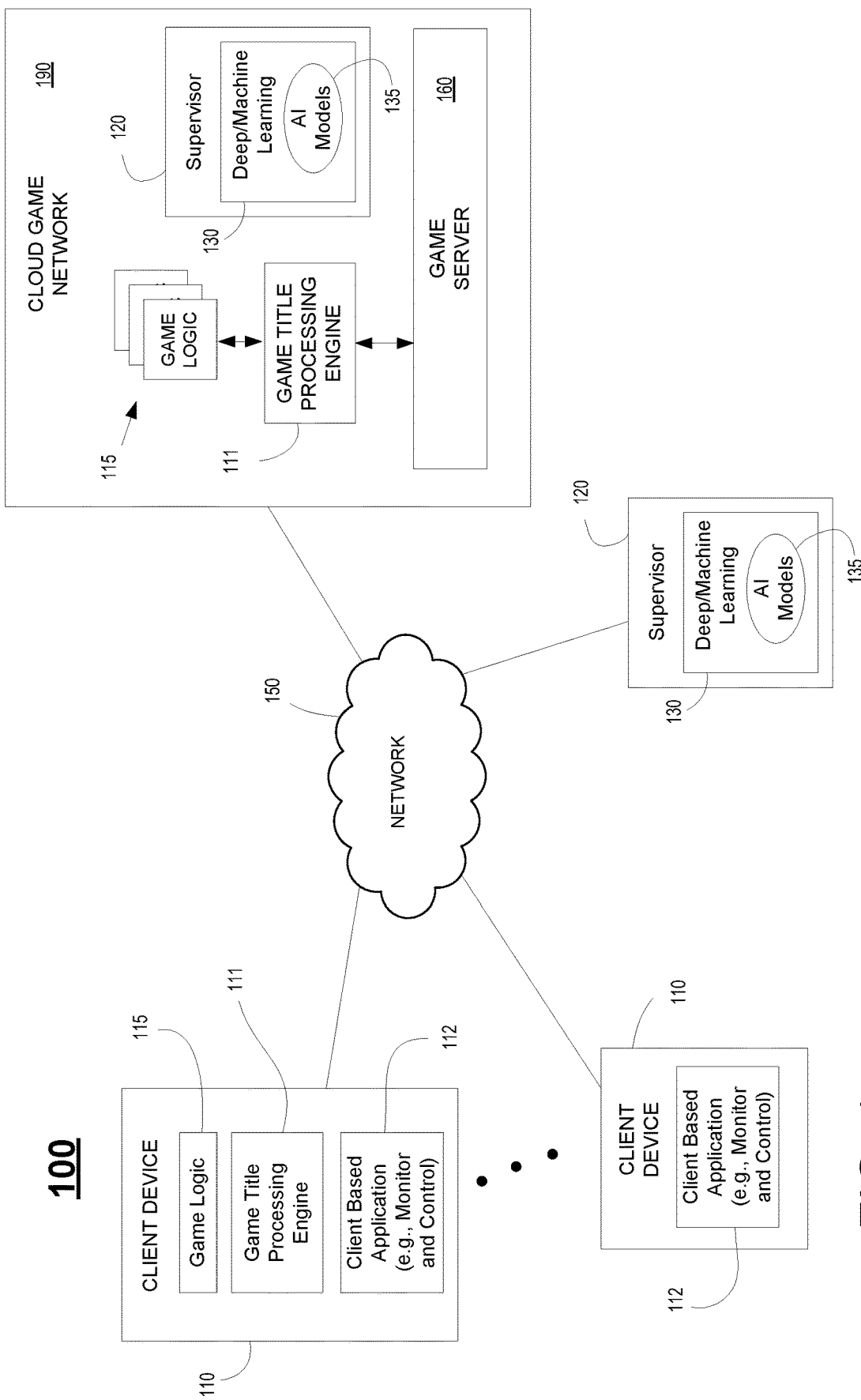
FIG. 1 illustrates a system including a supervisor configured to monitor devices and applications installed on user devices to facilitate loading of instances of an application providing a metaverse or virtual world locally or at a cloud based streaming server in support of initiation of a multi-player session of the application by a plurality of users in a group, in accordance with one embodiment of the disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods implementing a supervisor functionality at a back-end server configured to monitor computing devices of users and applications installed on those computing devices. In that manner, the supervisor understands which applications are installed on and/or executing on devices currently used by users. This knowledge of application and devices allows the supervisor to facilitate and/or manage the initiation of a multi-player session for a group or plurality of users wishing to participate together within a virtual world or metaverse that is generated by a corresponding application. If there is a local installation on a selected device of a corresponding user, because local execution of the corresponding application generating the metaverse can give the best user experience, then a local instance of the application is launched on the selected device that is local. On the other hand, if no local installation exists on the selected device of the corresponding user, then a cloud instance of the application is launched on a cloud based streaming server configured to stream game play of the corresponding user within the metaverse to the selected device. In that manner, the multi-player session can be established with local or cloud based instances of the application generating the metaverse for the users. Also, artificial intelligence (AI) techniques may be implemented to build AI models of the users predicting patterns of gaming participation. In that manner, recommendations by the supervisor may be provided to the plurality of users in the group recommending an application and/or corresponding metaverse to use for a multi-player session at any time or a recommended time.

Advantages of the methods and systems configured to implement a supervisor configured to facilitate instances of an application supporting a multi-player session on a local device or a cloud based streaming server for a plurality of users (i.e., in a group) include a seamless transition for a user into the metaverse generated by the application as a corresponding instance of the application is launched by the supervisor for each of the users in support of the multi-player session. As such, the supervisor manages the launching of instances of the application for the users even when the application is not installed locally on a corresponding device (i.e., not having to coordinate and/or wait for local install of the application). Because the supervisor is able to launch local instances and cloud based instances, each of the users in the plurality of users of the group can participate in the multi-player session immediately without waiting for an application to be downloaded and installed on a corresponding device. Other advantages include the supervisor configured to facilitate application install during or after a streaming session on a corresponding device, wherein the supervisor can query the user for application install, and facilitating the application install after receiving authorization from the user. Still other advantages include seamless transitions between one metaverse to another metaverse for a plurality of users in a group, as the supervisor is able to facilitate instances of an application generating the new metaverse, wherein the instances of the application (local and/or cloud based) support a multi-player session for the plurality of users. Still other advantages include seamless transitions from one device to another device executing an application in support of a gaming session of a user that is traveling from one location to another, wherein the transfer of the gaming session between devices is appropriate to provide the best gaming experience to the user. Still other advantages include having the supervisor build AI models of each of the users that predict game play patterns of the users. In that manner, the supervisor is able to provide recommendations of an application for a generic period of time or recommended period of time for a plurality of users in a group that would like to participate in a multi-player session together at some point in time.

Throughout the specification, the reference to "game" or video game" or "gaming application" is meant to represent any type of interactive application that is directed through execution of input commands. For illustration purposes only, an interactive application includes applications for gaming, word processing, video processing, video game processing, etc. Also, the terms "virtual world" or "virtual environment" or "metaverse" is meant to represent any type of environment generated by a corresponding application or applications for interaction between a plurality of users in a multi-player session or multi-player gaming session. Further, the terms introduced above are interchangeable.

With the above general understanding of the various embodiments, example details of the embodiments will now be described with reference to the various drawings.

FIG. 1 illustrates a system 100 including a supervisor 120 configured to monitor devices and applications installed on user devices to facilitate loading of instances of an application providing a metaverse or virtual world locally or at a cloud based streaming server in support of initiation of a multi-player session of the application by a plurality of users in a group, in accordance with one embodiment of the disclosure. The system 100 may be implemented to monitor application use and application install status on various devices of a plurality of users for various purposes. For example, the supervisor 120 of system 100 may be configured to facilitate initiation of the multi-player session of an application through automated launching of local instances of the application or cloud based instances of the application for selected devices of users in a group of users participating in the multi-player session. In another example, the supervisor is able to build artificial intelligence (AI) models that can predict the gaming behavior of users, such that the AI models are implemented to recommend applications and/or devices for a group of users for a multi-player session at any time or at particular times.

As shown, system 100 may provide gaming over a network 150 for and between one or more client devices 110. In particular, system 100 may be configured to provide gaming to users participating in a multi-player gaming session (e.g., participating in a metaverse generated by an application) via a cloud game network 190, wherein the game can be executed locally (e.g., on a local client device of a corresponding user) or can be executed remotely from a corresponding client device 110 (e.g., acting as a thin client) of a corresponding user that is playing the video game, in accordance with one embodiment of the present disclosure. In at least one capacity, the cloud game network 190 supports a multi-player gaming session for a group of users, to include delivering and receiving game data of players for purposes of coordinating and/or aligning objects and actions of players within a scene of a gaming world or metaverse, managing communications between user, etc. so that the users in distributed locations participating in a multi-player gaming session can interact with each other in the gaming world or metaverse in real-time.

In particular, system 100 may provide gaming control to one or more users playing one or more applications (e.g., video games) either through local instances operating on client devices or through cloud based instances operating in the cloud game network 190 via network 150 in the multi-player session. Network 150 may include one or more communication technologies, including $5^{th}$ Generation (5G) network technology having advanced wireless communication systems (e.g., cellular network technology). In some embodiments, the cloud game network 190 may include a plurality of virtual machines (VMs) running on a hypervisor of a host machine, with one or more virtual machines configured to execute a game processor module utilizing the hardware resources available to the hypervisor of the host. It should be noted, that access services, such as providing access to games of the current embodiments, delivered over a wide geographical area often use cloud computing. Cloud computing is a style of computing in which dynamically scalable and often virtualized resources are provided as a service over the internet.

In a multi-player session allowing participation for a group of users to interact within a gaming world or metaverse generated by an application (which may be a video game), some users may be executing an instance of the application locally on a client device to participate in the multi-player session. Other users who do not have the application installed on a selected device or when the selected device is not computationally powerful enough to executing the application may be participating in the multi-player session via a cloud based instance of the application executing at the cloud game network 190.

As shown, the cloud game network 190 includes a game server 160 that provides access to a plurality of video games. Most applications played in a corresponding multi-player session are played over the network 150 with connection to the game server 160. For example, in a multi-player session involving multiple instances of an application (e.g., generating virtual environment, gaming world, metaverse, etc.), a dedicated server application (session manager) collects data from users and distributes it to other users so that all instances are updated as to objects, characters, etc. to allow for real-time interaction within the virtual environment of the multi-player session, wherein the users may be executing local instances or cloud based instances of the corresponding application. Game server 160 may be any type of server computing device available in the cloud, and may be configured as one or more virtual machines executing on one or more hosts. For example, game server 160 may manage a virtual machine supporting a game processor that instantiates a cloud based instance of an application for a user. As such, a plurality of game processors of game server 160 associated with a plurality of virtual machines is configured to execute multiple instances of one or more applications associated with gameplays of a plurality of users. In that manner, back-end server support provides streaming of media (e.g., video, audio, etc.) of gameplays of a plurality of applications (e.g., video games, gaming applications, etc.) to a plurality of corresponding users. That is, game server 160 is configured to stream data (e.g., rendered images and/or frames of a corresponding gameplay) back to a corresponding client device 110 through network 150. In that manner, a computationally complex gaming application may be executing at the back-end server in response to controller inputs received and forwarded by client device 110. Each server is able to render images and/or frames that are then encoded (e.g., compressed) and streamed to the corresponding client device for display.

In the multi-player session, instances of an application may be executing locally on a client device 110 or at the cloud game network 190. In either case, the application as game logic 115 is executed by a game engine 111 (e.g., game title processing engine). For purposes of clarity and brevity, the implementation of game logic 115 and game engine 111 is described within the context of the cloud game network 190. In particular, the application may be executed by a distributed game title processing engine (referenced herein as "game engine"). In particular, game server 160 and/or the game title processing engine 111 includes basic processor based functions for executing the application and services associated with the application. For example, processor based functions include 2D or 3D rendering, physics, physics simulation, scripting, audio, animation, graphics processing, lighting, shading, rasterization, ray tracing, shadowing, culling, transformation, artificial intelligence, etc. In that manner, the game engines implement game logic, perform game calculations, physics, geometry transformations, rendering, lighting, shading, audio, as well as additional in-game or game-related services. In addition, services for the application include memory management, multi-thread management, quality of service (QoS), bandwidth testing, social networking, management of social friends, communication with social networks of friends, social utilities, communication channels, audio communication, texting, messaging, instant messaging, chat support, game play replay functions, help functions, etc.

Users access the remote services with client devices 110, which include at least a CPU, a display and input/output (I/O). For example, users may access cloud game network 190 via communications network 150 using corresponding client devices 110 configured for updating a session controller (e.g., delivering and/or receiving user game state data), receiving streaming media, etc. The client device 110 can be a personal computer (PC), a mobile phone, a netbook, a personal digital assistant (PAD), handheld device, etc.

In one embodiment, client device 110 may be configured with a game title processing engine and game logic for at least some local processing of an application, and may be further utilized for receiving streaming content as generated by the application executing at a back-end server, or for other content provided by back-end server support. In still other embodiments, for independent local processing the game title processing engine 111 includes basic processor based functions for executing an application and services associated with the application, as previously described. For local processing, the game logic 115 is stored on the local client device 110 and is used for executing the application. For example, an instance of an application is executing by the game title processing engine 111 of a corresponding client device 110. Game logic 115 (e.g., executable code) implementing the application is stored on the corresponding client device 110, and is used to execute the application. For purposes of illustration, game logic 115 may be delivered to the corresponding client device 110 through a portable medium (e.g. optical media) or through a network (e.g., downloaded through the internet from a gaming provider).

In one embodiment, client device 110 may be configured as a thin client providing interfacing with a back end server (e.g., game server 160 of cloud game network 190) configured for providing computational functionality (e.g., including game title processing engine 111). In particular, client device 110 of a corresponding user (not shown) is configured for requesting access to applications over a communications network 150, such as the internet, and for rendering for display images generated by a video game executed by the game server 160, wherein encoded images are delivered (i.e., streamed) to the client device 110 for display in association with the corresponding user. For example, the user may be interacting through client device 110 with an instance of an application executing on a game processor of game server 160 in association with gameplay of a corresponding user, such as through input commands that are used to drive the gameplay. Client device 110 may receive input from various types of input devices, such as game controllers, tablet computers, keyboards, gestures captured by video cameras, mice, touch pads, audio input, etc. More particularly, an instance of the application is executed by the game title processing engine 111 and is configured for generating rendered images, which is delivered over network 150 for display at a corresponding display in association with client device 110. That is, client device 110 is configured for receiving encoded images (e.g., encoded from game rendered images generated through execution of a video game), and for displaying the images that are rendered for display. Game title processing engine 111 is able to support a plurality of applications using a plurality of game logics, each of which is selectable by the user.

In addition, system 100 includes a back-end supervisor 120 with functionality configured to monitor computing devices of users, to include, in part, monitoring applications that are installed on those devices, when applications are used, when devices are used, and when applications are used on which devices during which periods. Supervisor 120 may be located at the cloud game network 190 or may be remote from the cloud game network 190. For example, supervisor 120 is able to leverage application install and device usage to facilitate the initiation of a multi-player session for a plurality of users (e.g., a group) wishing to participate and interact with each other in a virtual environment or metaverse. In particular, the supervisor 120 may manage the launching of local and/or cloud based instances of an application configured to generate the virtual environment or metaverse when instantiating a multi-player session based on whether the application is installed on a corresponding device.

In one embodiment, the supervisor 120 acts in cooperation with a client based application 112 installed on client device 110. For example, a corresponding client based application 112 is present on each of a plurality of client devices associated with a user, wherein each of the client based applications is in communication with the supervisor 120 in order to understand which applications are installed and/or running on which devices for the user. In particular, supervisor 120 communicates with a corresponding client based application 112 in order to access and/or gather information about which applications are installed and/or running on a corresponding client device. In addition, the supervisor is able to control the corresponding client device 110 via the corresponding client based application 112, including having the client device launch local instances of an application on that client device. In one embodiment, the client based application 112 could be a very small program, such as a daemon that has no user interface and is running in the background. In another embodiment, the client based application 112 could be part of a full-fledged client application, such as an application loaded onto a gaming platform or computer or equivalent device, etc.

In some embodiment, the supervisor 120 includes artificial intelligence (AI) to include a deep/machine learning engine 130 configured build or train and implement an AI model 135 for each of a plurality of users with devices monitored by the supervisor 120. In one embodiment, the AI learning model 135 is a machine learning model configured to apply machine learning to learn gaming usage and/or play behavior of users and make recommendations based off that behavior. In another embodiment, the AI learning model is a deep learning model configured to apply deep learning to learn gaming usage behavior of users and make recommendations based off that behavior, wherein machine learning is a sub-class of artificial intelligence, and deep learning is a sub-class of machine learning. As such, artificial intelligence is used to learn gaming usage behavior of users and make recommendations based off that behavior. In particular, a corresponding AI model 135 is configured to learn the usage patterns of a corresponding user, to include learning which applications the user likes to play during which time periods, and learning which devices the user prefers to play those applications. In that manner, the AI model 135 can predict which applications during which time periods and on which devices a corresponding user prefers. For a group of users that wish to participate in a virtual world or metaverse (e.g., a gaming world of a video game) in a multi-player session, the supervisor 120 through the corresponding AI models of the group of users is configured to recommend to the group of users a particular application for the requested multi-player session, and more particularly for any time period, or for a particular time period.

Purely for illustration, the deep/machine learning engine 190 may be configured as a neural network used to train and/or implement the AI model 135, in accordance with one embodiment of the disclosure. Generally, the neural network represents a network of interconnected nodes responding to input (e.g., extracted features) and generating an output (e.g., learn gaming usage and/or play behavior of users and providing a recommendation). In one implementation, the AI neural network includes a hierarchy of nodes. For example, there may be an input layer of nodes, an output layer of nodes, and intermediate or hidden layers of nodes. Input nodes are interconnected to hidden nodes in the hidden layers, and hidden nodes are interconnected to output nodes. Interconnections between nodes may have numerical weights that may be used link multiple nodes together between an input and output, such as when defining rules of the AI model 135.

Figure 2:
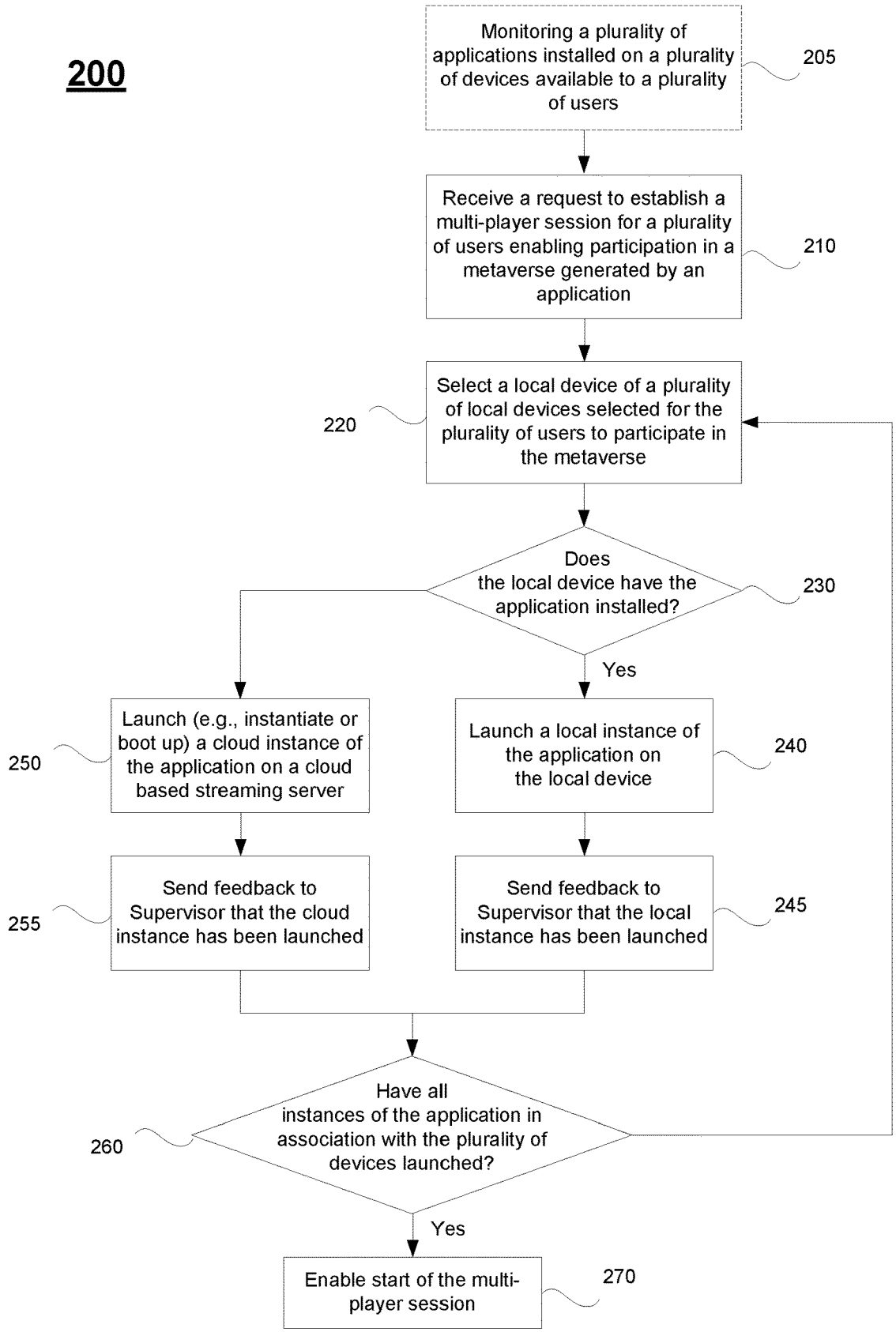
FIG. 2 is a flow diagram illustrating a method for launching instances of a metaverse or application in support of a multi-player session by a group of users, in accordance with one embodiment of the present disclosure.

With the detailed description of the system 100 of FIG. 1, flow diagram 200 of FIG. 2 discloses a method for that is configured to monitor application install on devices and device usage of users in order to facilitate the initiation of a multi-player session for a plurality of users (e.g., a group), in accordance with one embodiment of the present disclosure. The operations performed in the flow diagram may be implemented by one or more of the entities previously described components, and also system 100 described in FIG. 1, including supervisor 120. In particular, FIG. 2 is a flow diagram illustrating a method for launching instances of a metaverse or application in support of a multi-player session by a group of users, in accordance with one embodiment of the present disclosure. The multi-player session may be initiated by launching a corresponding application (e.g., used for generating a desired virtual world and/or metaverse, etc.) across different platforms of different devices (e.g., mobile device, mobile phone, tablet, thin client, gaming console, computer tower, server, etc.). For example, the different platforms may include different operating systems of the various devices, such as a first local device executing a first operating system, and a second local device executing a second operating system.

At 205, the method includes monitoring a plurality of applications installed on a plurality of devices available to a plurality of users. The plurality of users includes all users utilizing the supervisor services. For example, the plurality of users may include one or more groups of users that each would like to participate in a corresponding virtual world or metaverse together in a corresponding multi-player session. That is, one group of users may utilize the supervisor and the method implemented in flow diagram 300 to facilitate a multi-player session conducted within a corresponding virtual world or metaverse. In particular, for a corresponding user that is associated with multiple devices and one or more selected devices that the user is currently using, each device of the user is monitored to track which applications are installed on that device, and furthermore which applications can be installed on that device based on the computing power, memory capabilities, etc. of that device.

At 210, the method includes receiving over a network a request to establish a multi-player session for a plurality of users (e.g., a group) to enable participation in a virtual world and/or metaverse generated by an application. In particular, the users may be friends or social group that enjoys playing within any of a number of virtual worlds, and may wish at a particular time (e.g., a current time, or a future time, or any suggested time, etc.) to play together in a multi-player session. For example, the application is a video game in one implementation, and in the multi-player session (e.g., multi-player gaming session) the users are participating in a virtual world or metaverse generated by the video game.

In general, a multi-player session is initiated and/or established by instantiating a plurality of instances of the application that generates the virtual world and/or metaverse for the plurality of users (e.g., group of users). In some cases, a user may have to transfer from one application (e.g., terminate) to another application generating the virtual world and/or metaverse (e.g., move between virtual experiences), which is coordinated by the supervisor implementing flow diagram 300. The method of flow diagram 300 determines whether the application configured to generate the virtual world and/or metaverse is installed on a plurality of local devices of the plurality of users selected for the participation in the metaverse by the plurality of users. Depending on whether the application is installed locally or not, a local instance of the application or cloud based instance is launched to facilitate the initiation and/or establishment of a multi-player session enabling participating in the virtual world and/or metaverse by the plurality of users (e.g., group). The below operations are repeated and/or looped until each device of the users has a corresponding instance of the application executing for participation in the multi-player session.

At 220, the method includes selecting a local device of the plurality of local devices selected for the plurality of users to participate in the virtual world and/or metaverse that is generated by a corresponding application. The local device is associated with a corresponding user, wherein the local device may be the current device used by the corresponding user, or selected for participation in the multi-player session by the corresponding user, or may be automatically selected when implementing the method of flow diagram 300 (e.g., by supervisor based on a corresponding AI model of the corresponding user).

At decision step 230, the method includes determining whether the local device of the corresponding user has the application installed, wherein the application is configured for generating the virtual world and/or metaverse within which the users wish to interact with each other in the multiplayer session.

At 240, if the application is installed on the local device of the corresponding user, then the method includes launching (e.g., instantiating, initiating, etc.) a local instance of the application on the local device. For example, this may include launching the locally installed application on the corresponding local device (i.e., as the instance). In particular, for a first user the method may include determining that the application is installed on a first local device of the first user. As previously described, the first local device may be selected by the first user for participation in the virtual world and or metaverse generated by the application in the multi-player session. As such, a first local instance of the application is launched on the first local device for first participation in the metaverse by the first user.

At 245, the method includes sending feedback back to an entity (e.g., to a manager or supervisor facilitating the initiation of the multi-player session) that the local instance of the application has been launched. In that manner, one entity is configured to track the launching of instances of the application for all users in the plurality of users (e.g., group) participating in the multi-player session. Thereafter, the method proceeds to decision step 260.

In one embodiment, with regards to legacy games that do not report back to any entity and does not provide feedback, an instruction may be sent to the local device to generate and/or display a pop-up user interface (UI) which asks the user to confirm when the application is ready for use (e.g., has been installed on the local device). For example, the UI may display a message that asks the user to click a button when the application has launched, such as a message including "Once the application is running, click 'Ready' to continue," wherein "Ready" is placed in a window that allows for user selection. In that manner, a message is returned to the entity (e.g., supervisor) managing the initiation of the multi-player session indicating that the local instance has been installed on the local device without having the application send back the information as feedback. In another embodiment, the local device may be instructed and/or requested to send a screenshot of the display of the local device back to the entity (e.g., supervisor) managing the initiation of the multi-player session every few seconds while the application is launching. Further, the back-end entity (e.g., supervisor) managing the initiation of the multi-player session can use computer vision and/or AI to perform image recognition that recognizes when the application is running (e.g., for example, the title screen of the application is recognized).

At 250, if the application is not installed on the local device of the corresponding user, then the method includes launching (e.g., instantiating, initiating, etc.) a cloud based instance of the application on a cloud based streaming server (e.g., at the cloud game network 190). The cloud based instance is used to execute the application so that the corresponding user is able to participate in the multi-player session in the virtual world and/or metaverse generated by the application. Continuing with the example provided above, after determining that the application is not installed on the first local device of the first user, a first cloud instance of the application is launched on the cloud based streaming server for first participation in the virtual world and/or metaverse by the first user. In that manner, even though a local instance of the application cannot be launched for game play in the multi-player session, the corresponding user need not wait for a download and installation of the application on the local device before participating in the multi-player session, as the cloud based instance of the application allows for the corresponding user to participate in the virtual world and/or metaverse of the application with the other users in the multi-player session.

At 255, the method includes sending feedback back to the entity (e.g., to a manager or supervisor facilitating the initiation of the multi-player session) that the cloud based instance of the application has been launched. In that manner, the entity is configured to track the launching of instances (e.g., local and/or cloud based instances) of the application for all users in the plurality of users (e.g., group) participating in the multi-player session. Thereafter, the method proceeds to decision step 260

At decision step 260, the method includes determining whether all instances of the application in association with the plurality of devices have been launched. That is, the method determines whether all local and/or cloud based instances of the application for the plurality of users (e.g., in the group) have been launched thereby enabling participation by all the user in the multi-player session. If there is at least one remaining instance yet to be launched, the method proceeds back to operation 220 to launch a local or cloud based instance of the application for the next corresponding local device. On the other hand, if all instances of the application (e.g., local instances and/or cloud based instances) have launched, then the method proceeds to 270.

At 270, the method includes enabling a start of the multi-player session when each of the plurality of instances of the application for the plurality of users has been launched. That is, the users are joined in the multi-player session. As previously described, the instances may be local instances executing on local devices of corresponding users, or cloud based instances executing on a game cloud system. For example, the method may include sending notification to a session manager of a cloud based streaming server or a cloud game network that the each of the plurality of instances of the application for the plurality of users has been launched, wherein the session manager supports the multi-player session, as previously described.

In another embodiment, when the method determines that the application is not installed on the local device of the corresponding user, in addition to launching a cloud based instance of the application, a request is sent to the corresponding user via the local device with a query asking whether the user would like to install the application on the local device. The delivery of the query may occur during or near the launch of the cloud based instance, during the game play of the multi-player session, or after the multi-player session ends. After receiving authorization to perform the install, the method may include instructing the local device to download the application. A time for downloading the application may be presented to the user (e.g., immediately, after the end of the multi-player session, at some appointed time period, etc.).

As previously described, the query or prompt to the user could happen at the time of game launch (e.g., the launching of the cloud based instance), wherein the query may ask the user whether or not to install the application on the local device. For example, the message may include the following: "This game is available for download on your device. Would you like to install it?" Several options for the user to select in response may include: "Install Now|Install Later-|Remind Me Later|No, Thanks." For example, the user can opt to install the application later or get a reminder, so that the download doesn't interfere with (i.e., introduce connection instabilities) and consume bandwidth during the streaming of the current game play in the current multi-player session. More particularly, the "Install Later" option could tell the supervisor to send another message (e.g., a download message) once gameplay of the multi-player session is complete, or when the device is idle, or during the middle of the night, or at a user specified time period, or at a predefined time period, etc. Further, the query or prompt could happen as the end of the multi-player session. For example, the query and/or prompt may include: "For best results next time you play, install the corresponding Application on your device." Several options for the user to select in response may include: "Install Now|Install Later|Remind Me Later|No, Thanks."

In one embodiment, the query to install the application may be provided for the user's benefit. The query or prompt may be generated when a cloud stream is interrupted or a connection drops. For example, the query and/or prompt may include: "It seems like your connection is unstable. For best results, install the game on your device." Several options for the user to select in response may include: "Install Now|Install Later|Remind Me Later|No, Thanks." As an illustration, during the multi-player session, one user may be participating using a cloud based instance of the application, and may be further experiencing connection instabilities (e.g., periodic disturbances in the connection). This may occur in a case where a user is on a device where the game could be installed, but has not yet been installed (e.g., on a mobile device). In the case where the user is participating in a multi-player application with a group of users (e.g., a first person shooter game in a war setting), the user has yet to install the application on the mobile device, even though the application can be installed on the mobile device. As previously described, the method determines that the user should have the game play streamed back to the user (using a cloud based instance of the application). Because the stream can be fragile and may be interrupted/dropped for all sorts of reasons, the supervisor implementing the method may know through tracking that an installable version is available for that mobile device. In that case, the method includes sending a message to the mobile device with instructions to query the user asking whether the user would like to download the application for a better user experience (e.g., better stability in the game play through a local instance of the application) in the current multi-player session or in a future multi-player session.

In another embodiment, there may be connection issues with locally installed instances of the application. For example, the connection through the network back to the session manager that coordinates game play of one of the users in the multi-player session may be interrupted or dropped. In that case, the user's game play that is suffering from connection issues or has been dropped cannot be transmitted to the multiplayer servers (e.g., the session manager). As a solution, the method (e.g., implemented by the supervisor) may periodically ping each of the devices used by the users in the multi-player session to check whether a connection still exists.

If a corresponding device cannot be reached or fails the ping request, the method could include sending a message to the devices of the other users in the multi-player session that the disconnected user seems to be experiencing connection issues. In that manner, the other users are notified that there may be a problem communicating with the disconnected user, or that the character of the disconnected user may be experiencing problems. For example, the supervisor may be configured to periodically ping each of the plurality of local devices used by the plurality of users in the multi-player session. The method may include determining that a connection to a first local device of a first user is terminated during the multi-player session. The first local device is used by the first user for first participation in the multi-player session. The method may include providing a notification to each of the plurality of local devices (e.g., to the other users in the multi-player session) that is connected over the network that the connection to the first user is experiencing a connection issue. In that manner, the other users are notified that the disconnected user is having problems participating in the multi-player session.

As previously introduced, an AI model can be built for each user for which devices are monitored by a supervisor. For example, the AI model predicts for a corresponding user play behavior including learning the following: when the corresponding user plays video games, which video games they play, and on which devices are the video games played, and at which times the user plays those video games. As such, the AI model can be used to provide recommendations. For example, the AI models for a group of users may be analyzed to find various ways to optimize a group's play experience with minimal disruptions.

In one embodiment, the supervisor analyzing the AI models of users in a group may proactively suggest play times based on when everyone is typically in a stable environment. For example, the suggested time may occur when each user is able to interface with a gaming console or personal computer, is connected via a local area network (LAN) instead of Wi-Fi, not commuting when on a mobile device (e.g., a stable connection) such that a global positioning satellite (GPS) location is static, etc.

In one embodiment, the supervisor analyzing the AI models of users in a group may determine that everyone who wants to play together in a multi-player session has a particular application (e.g., video game, etc.) installed on their current devices. In that case, the supervisor may recommend one particular game as the "best experience" since each player can launch a local instance of the application, and that no player has to stream their game play (i.e., no cloud instances of the application), wherein streaming game play may introduce additional latency giving that user a delay in experiencing the multi-player session when compared to other users. For example, the method implemented by a supervisor may include receiving an initial request for coordinated interaction between the plurality of users. The method including determining a plurality of applications installed on the plurality of local devices of the plurality of users (e.g., in the group). The method including determining that the application is installed on each of the plurality of local devices. The method including providing a response to the initial request to each of the plurality of local devices recommending the application configured to generate the metaverse for the coordinated interaction. For example, FIG. 3 illustrates data collected by the supervisor in order to make a recommendation based on which applications are installed on which devices of a group of users wishing to participate in the multi-player session.

Figure 3:
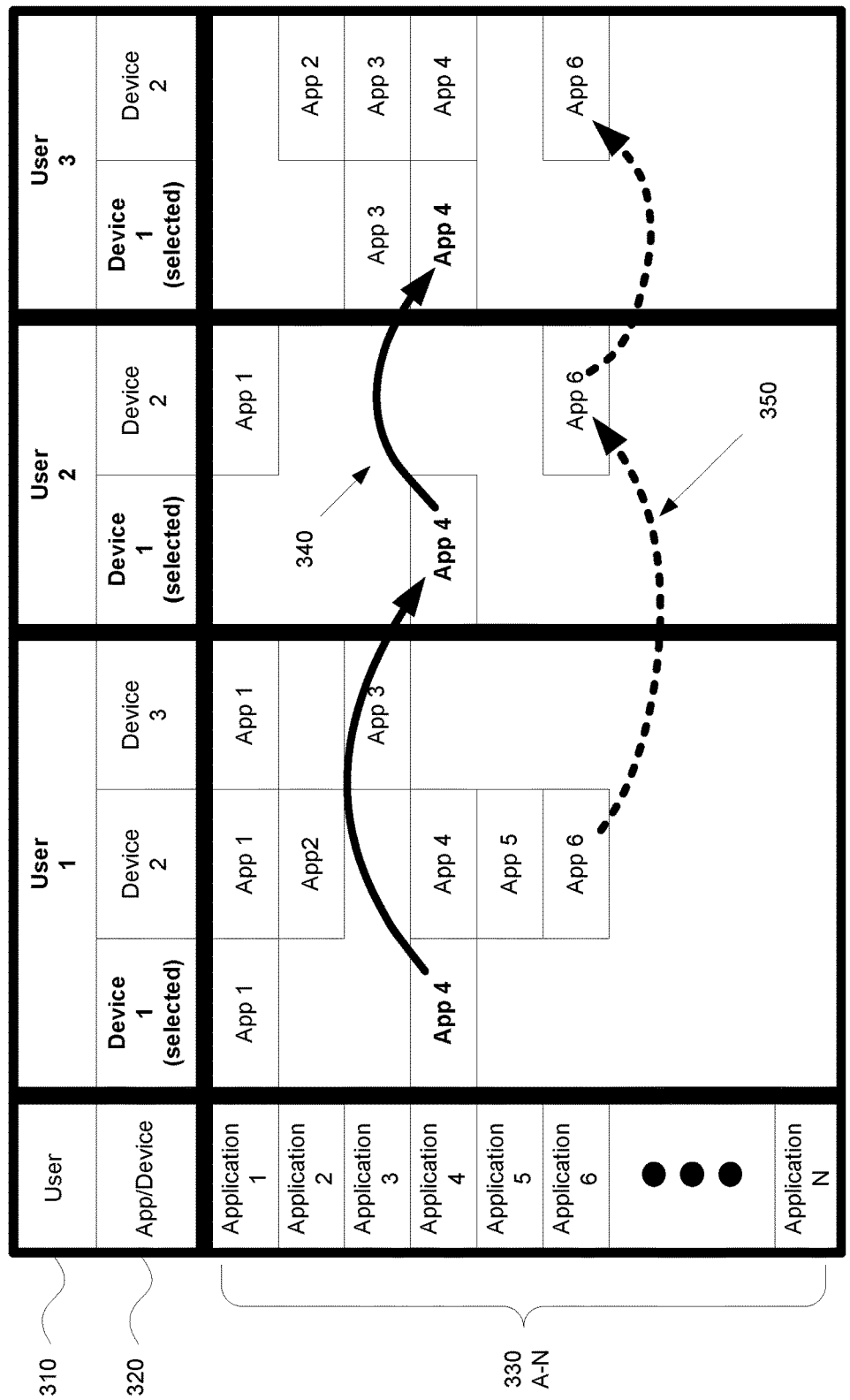
FIG. 3 illustrates information captured and monitored by a supervisor configured to monitor devices and applications installed on user devices, wherein the supervisor is configured to launch instances of an application configured to generate a metaverse or virtual world on a local device or at a cloud based streaming server and/or make recommendations on an application for a group of users to participate within a multi-player session, in accordance with one embodiment of the present disclosure.

In particular, FIG. 3 illustrates a table 300 including information captured and monitored by a supervisor configured to monitor devices and applications installed on user devices, in accordance with one embodiment of the present disclosure. The supervisor is configured to launch instances of an application configured to generate a metaverse or virtual world on a local device or at a cloud based streaming server and/or make recommendations on an application for a group of users to participate within a multi-player session, in accordance with embodiments of the present disclosure. In particular, the information in table 300 may be used to recommend an application to a group of users wishing to participate in a multi-player session.

As shown, table 300 includes row 310 that lists a plurality of users. In the current example, the plurality of users is a group of users that wish to participate in a multi-player session. that is, table 300 is specific to a group of users. Of course, in other embodiments, the supervisor is able to monitor a large plurality of users to include one or more groups. For example, the group of users in row 310 may include user 1, user 2, and user 3.

Table 300 includes row 320, which lists devices for each of the users. For each user, at least one device is selected for participation in the multi-player session, as previously described (e.g., is the current device used by the corresponding user, selected by corresponding user, selected by AI model, etc.). For example, user 1 has device 1, device 2, and device 3, wherein device 1 is the currently selected device. Also, user 2 has device 1 and device 2, wherein device 1 is the currently selected device. Further, user 3 has device 1 and device 2, wherein device 1 is the currently selected device.

Table 300 includes a list of available applications in rows 330A-N. This may include all applications or a selected library of applications. For example, the applications may include applications A-N (also referred to as app A-N), which are available for local install on one or more of the devices utilized by the users in row 310. As shown, each of the users may not install all of the applications, and may choose to install a select few applications on each device. In fact, for one user with multiple devices, each device may have different sets of applications installed on those devices. For example, the applications installed for user 1 include: app 1 and app 4 are installed on device 1; apps 1-2 and apps 4-6 are installed on device 2; and app 1 and app 3 are installed on device 3. Also, the applications installed for user 2 include: app 4 on device 1; and app 1 and app on device 2. Further, the applications installed for user include: apps 3-4 on device 1, and apps 2-4 and app 6 on device 2.

As shown in table 300, connection 340 (solid and bolded line) shows a relationship of applications to users that may be determined through monitoring of devices by the supervisor. In particular, connection 340 shows that app 1 is installed on devices for each of the users 1, 2 and 3. That is, each of the users has app 1 installed on their corresponding device 1 (e.g., selected or current device). As previously described, because users in the group wanting to play in a multi-player session immediately has a particular application (e.g., video game, etc.) installed on their current devices, the supervisor may recommend app 1 to the group of users. That is, the supervisor may determine that app 1 may give the group of users the "best experience" as each player can launch a local instance of app 1 (i.e., no player has to stream their game play from a cloud instance).

Also shown in table 300, connection 350 (e.g., dotted and bolded line) can be used to show an application that is recommended for a future point in time. In particular, the supervisor may predict using corresponding AI models of the users in the group that app 6 is installed on devices of each of the users. For example, user 1 may have app 6 installed on device 2, and user 2 may have app 6 installed on device 2, and user 3 may have app 6 also installed on device 2. These devices may not be selected by any user as their current devices. However, the corresponding AI models may indicate that the users 1, 2, and 3, each use their corresponding devices 2 during a common period of time. For example, the devices 2 may be game consoles which are active between 6 and 9 pm for each of the users 1-3, or that the users have access to the game consoles (e.g., at home). Because app 2 is installed on each of the corresponding devices 2 of each of the users 1-3, the supervisor may recommend app 6 to the group including users 1-3, to be played in a multi-player gaming session between the hours of 6 to 9 pm.

Figure 4:
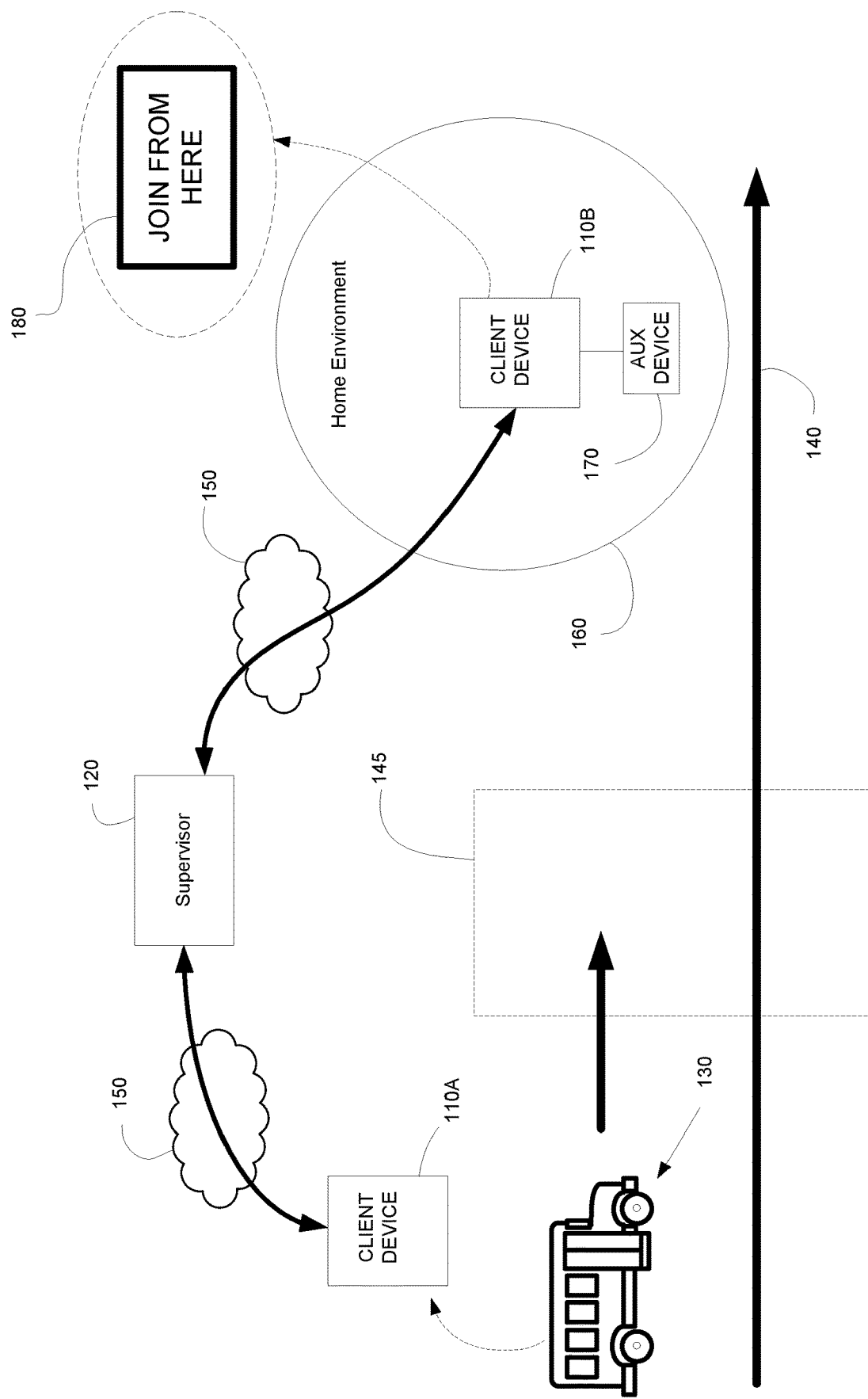
FIG. 4 is a diagram illustrating a supervisor facilitating a transfer between devices of a user of an application as a user moves through a physical environment, in accordance with one embodiment of the present disclosure.

FIG. 4 is a diagram illustrating a supervisor 120 facilitating a transfer between devices of a user of an application as a user moves through a physical environment, in accordance with one embodiment of the present disclosure. As shown, a user is traveling along geographic location line 140 back to a home environment 160. For instance, the user is traveling on a bus 130.

If the metaverse is supposed to be an "always connected" experience, there will be times when a user may want to switch between devices while in the middle of an experience (e.g., game play of an application in single-player or multi-player mode). For example, maybe a user is attending a virtual concert with other friends, each of which is also attending virtually, in a multi-player session. For illustration, the virtual concert is a two-hour experience. For the first hour, the user is on the bus 130 and also attending the virtual concert. That is, the user is watching and/or participating in the virtual concert via a mobile device (e.g., client device 110A). At some point, the user arrives home (arrives in home environment 160), and wants to attend the second hour of the virtual concert from a gaming console or stand-alone computer (e.g., client device 110B).

As shown, supervisor is connected to each of devices 110A and 110B through network 150 throughout the user's travels along geographic location line 140. The supervisor 120 could "warm up" the console (client device 110B) when the user is within a certain proximity, or at a pre-programmed time. For example, the supervisor 120 may determine that the user is close to the home environment 160 (e.g., detect that the client device 110A currently in use by the user is within geographic region 145 that is close in proximity to the home environment 160), and take further action. The geographic region 145 may include the bus stop where the user typically exits the bus on the way to the home environment 160. As the user reaches and enters geographic region 145 (e.g., as the bus approaches the stop), the supervisor may send a message to the gaming console (e.g., client device 110B) telling it to wake up, launch the virtual concert, and prepare to join the user to the session. As such, when the user returns to the home environment 160, the user may interact with the console (e.g., client device 110B) and see an interactable button 180. The user need only click the "Join From Here" button on the console (e.g., in association with the client device 110B), and the multi-player session is seamlessly transferred to the new device (e.g., client device 110B) of the user. In that manner, the user is able to participate in the virtual concert seamlessly because the multi-player session of the virtual concert is transferred to the client device 110B in the home environment 160 in time before the user returns to the home environment 160.

In another embodiment, an extension to supervisor functionality 120 includes transferring a Bluetooth connection for a corresponding audio device. For example, when the user is traveling on bus 130 and using client device 110A, earbuds may be paired to the mobile phone (e.g., client device 110A). The supervisor 120 can coordinate the seamless transfer of the pairing of the same earbuds to the client device 110B in the home environment 160, wherein the earbuds may be connected as an auxiliary device 170 via the client device 110B (e.g., console). In one embodiment, the "Join From Here" button 180 may be configured to also trigger the client device 110B (e.g., console) to connect to the earbuds as well. In that case, the supervisor interacts with the client device 110A (e.g., mobile phone) to determine ahead of time (e.g., before the transfer of the Bluetooth pairing) which earbuds are used by the user. The supervisor 120 delivers the information regarding the earbuds to the console (e.g., client device 110B), so the "Join From Here" button 180 also triggers and additional action for client device 110B to connect to the correct earbuds.

In still another embodiment, if the earbuds have not previously been paired to the client device 110B, the supervisor can coordinate the pre-pairing process. For instance, the supervisor 120 can pass pairing information from client device 110A (e.g., mobile phone) to client device 110B (e.g., console), and instruct the client device 110B to pre-pair the earbuds before the user arrives in the home environment 160. For example, all of the pairing info can be loaded into the client device 110B (e.g., console) so that when the user arrives in the home environment 160, all the client device 110B needs to do is connect to the earbuds over Bluetooth, or any other wireless connection format.

In another embodiment, the transfer between devices could work in reverse. For example, the supervisor 120 may know that the user is leaving the home environment 160 as predicted by the AI model. For instance, the user may leave for work at a particular time during the day, and travels to work using the bus 130. As such, when a user is engaged with an application in the home environment 160, but may possibly be leaving the home environment 160, the supervisor 120 could pre-boot or launch the application on the client device 110A (e.g., mobile phone). In another case, when the client device 110A does not have the application installed, the supervisor may pre-boot or launch a cloud based instance of the application, so that the cloud based instance is ready to stream execution of the application to the client device 110A at the appropriate time (e.g., when the user instructs the transfer to the stream, or when entering into zone 145 of the geographic line 145.

Figure 5:
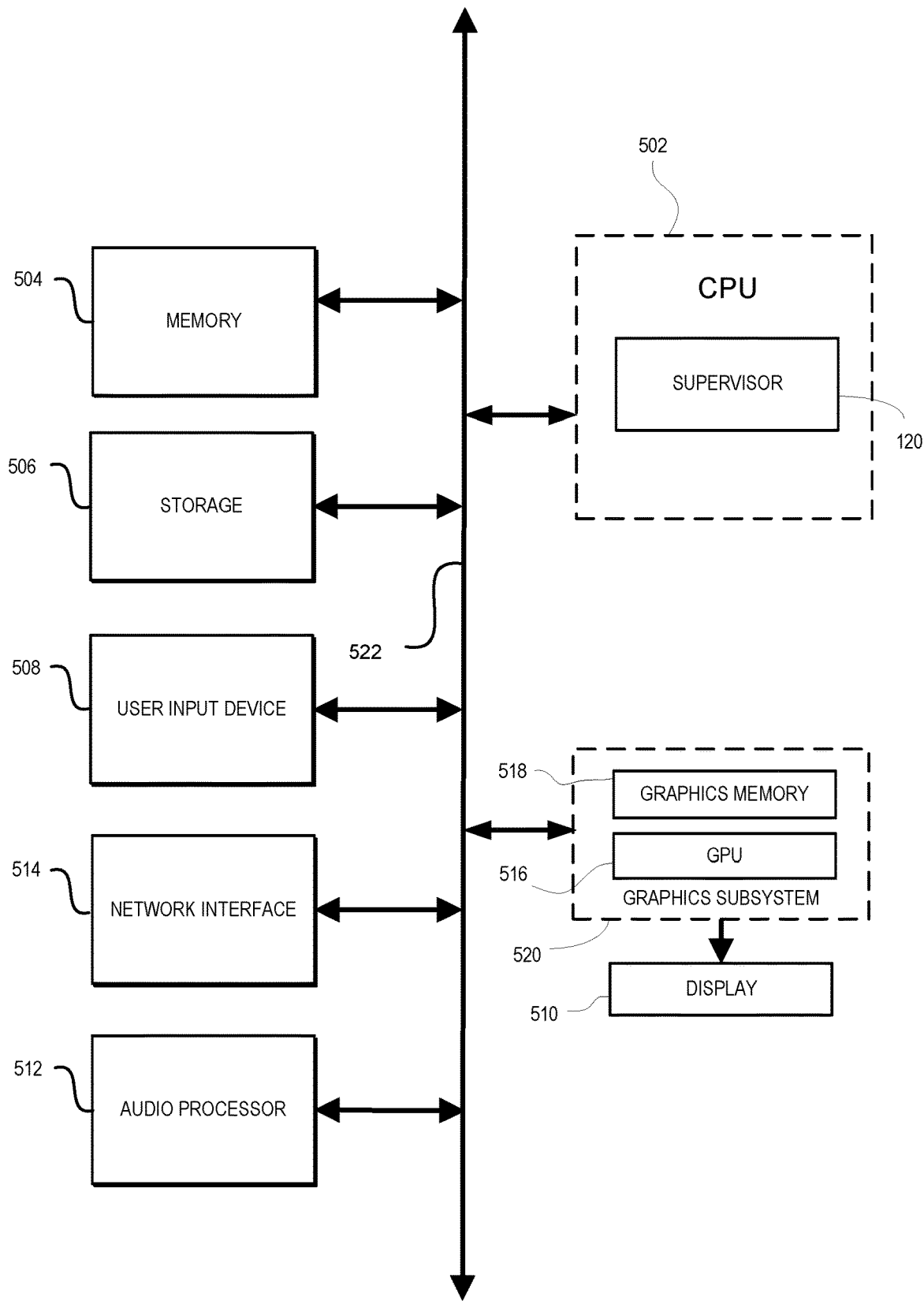
FIG. 5 illustrates components of an example device that can be used to perform aspects of the various embodiments of the present disclosure.

FIG. 5 illustrates components of an example device 500 that can be used to perform aspects of the various embodiments of the present disclosure. This block diagram illustrates a device 500 that can incorporate or can be a personal computer, video game console, personal digital assistant, a server or other digital device, suitable for practicing an embodiment of the disclosure. Device 500 includes a central processing unit (CPU) 502 for running software applications and optionally an operating system. CPU 502 may be comprised of one or more homogeneous or heterogeneous processing cores. For example, CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 500 may be a localized to a player playing a game segment (e.g., game console), or remote from the player (e.g., back-end server processor), or one of many servers using virtualization in a game cloud system for remote streaming of gameplay to clients, or for implementing additional services such as a supervisor functionality.

In particular, CPU 502 may be configured to implement supervisor 120 with functionality configured to monitor computing devices of users and applications installed on those computing devices in order to facilitate and/or manage the initiation of a multi-player session for a plurality of users (e.g., in a group) wishing to participate together within a virtual world and/or metaverse that is generated by a corresponding application (e.g., participate in a multi-player gaming session). For example, the supervisor 120 may launch local instances and/or cloud based instances of the application for the users participating in the multi-player session. In that manner, the initiation and establishment of the multi-player session may occur automatically without user input beyond the request and acknowledgment to play in the multi-player session, and without waiting for any application install to a local device of any user.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 510, and audio processor 512 are connected via one or more data buses 522.

A graphics subsystem 520 is further connected with data bus 522 and the components of the device 500. The graphics subsystem 520 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 516, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs. In one embodiment, GPU 516 may be implemented within an AI engine (e.g., machine learning engine 190) to provide additional processing power, such as for the AI, machine learning functionality, or deep learning functionality, etc.

The graphics subsystem 520 periodically outputs pixel data for an image from graphics memory 518 to be displayed on display device 510. Display device 510 can be any device capable of displaying visual information in response to a signal from the device 500, including CRT, LCD, plasma, and OLED displays. Device 500 can provide the display device 510 with an analog or digital signal, for example.

In other embodiments, the graphics subsystem 520 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for monitoring and/or supervising computing devices available to users and the applications installed on those devices in order to facilitate loading of instances of an application locally or at a cloud based streaming server for use by a group of users in a multi-player session, and for the building of AI models of the users predicting game usage and behavior of the users to recommend applications to the group of users at any time or for a particular point in time.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

Access to the cloud gaming network by the client device may be achieved through a communication network implementing one or more communication technologies. In some embodiments, the network may include $5^{th}$ Generation (5G) network technology having advanced wireless communication systems. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers.

Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g., tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
receiving over a network a request to establish a multi-player session for a plurality of users to enable participation in a metaverse;
determining, via a supervisor, whether an application configured to generate the metaverse is installed on a plurality of local devices of the plurality of users selected for the participation in the metaverse by the plurality of users, wherein the supervisor is installed on a back-end server connected to a network and is configured to monitor local devices of the plurality of users and applications installed on the local devices;
responsive to the request to establish the multi-player session, automatically, by the supervisor, launching a corresponding local instance of the application on a corresponding local device when the application is determined as already installed on the corresponding local device;
automatically, by the supervisor, launching a corresponding cloud instance of the application on a cloud based streaming server when the application is not installed on the corresponding local device;

determining that each of a plurality of instances of the application for the plurality of users has been launched, wherein the each of the plurality of instances is a local instance or a cloud instance; and enabling a start of the multi-player session when the each of the plurality of instances of the application for the plurality of users has been launched.

2. The method of claim 1, wherein the enabling the start of the multi-player session includes:
notifying the cloud based streaming server that the each of the plurality of instances of the application for the plurality of users has been launched, wherein the cloud based streaming server supports the multi-player session.

3. The method of claim 1, wherein the launching the corresponding local instance of the application includes:
determining that the application is installed on a first local device of a first user, wherein the first local device is selected for participation by the first user in the metaverse; and
launching a first local instance of the application on the first local device for first participation in the metaverse by the first user.

4. The method of claim 1, wherein the launching the corresponding cloud instance of the application includes:
determining that the application is not installed on a first local device of a first user; and
launching a first cloud instance of the application on the cloud based streaming server for first participation in the metaverse by the first user.

5. The method of claim 4, further comprising:
sending a request to the first user via the first local device to install the application on the first local device;
receiving authorization to perform the install; and
instructing the first local device to download the application.

6. The method of claim 1, wherein the application is a video game.

7. The method of claim 1, further comprising:
monitoring a plurality of applications installed on a plurality of devices available to the plurality of users.

8. The method of claim 1, further comprising:
periodically pinging each of the plurality of local devices;
determining that a connection to a first local device of a first user is terminated during the multi-player session, wherein the first local device is used by the first user for first participation in the multi-player session; and
providing a notification to each of the plurality of local devices that is connected over the network that the connection to the first user is experiencing a connection issue.

9. The method of claim 1, further comprising:
receiving an initial request for coordinated interaction between the plurality of users;
determining a plurality of applications installed on the plurality of local devices of the plurality of users;
determining that the application is installed on each of the plurality of local devices; and
providing a response to the initial request to each of the plurality of local devices recommending the application configured to generate the metaverse for the coordinated interaction.

10. The method of claim 1,
wherein a first local device executes a first operating system, and
wherein a second local device executes a second operating system.

11. A non-transitory computer-readable medium storing a computer program for performing a method, the computer-readable medium comprising:
program instructions for receiving over a network a request to establish a multi-player session for a plurality of users to enable participation in a metaverse;
program instructions for determining, via a supervisor, whether an application configured to generate the metaverse is installed on a plurality of local devices of the plurality of users selected for the participation in the metaverse by the plurality of users, wherein the supervisor is installed on a back-end server connected to a network and is configured to monitor local devices of the plurality of users and applications installed on the local devices;
responsive to the request to establish the multi-player session, program instructions for automatically, by the supervisor, launching a corresponding local instance of the application on a corresponding local device when the application is determined as already installed on the corresponding local device;
program instructions for automatically, by the supervisor, launching a corresponding cloud instance of the application on a cloud based streaming server when the application is not installed on the corresponding local device;
program instructions for determining that each of a plurality of instances of the application for the plurality of users has been launched, wherein the each of the plurality of instances is a local instance or a cloud instance; and
program instructions for enabling a start of the multi-player session when the each of the plurality of instances of the application for the plurality of users has been launched.

12. The non-transitory computer-readable medium of claim 11, wherein the program instructions for enabling the start of the multi-player session includes:
program instructions for notifying the cloud based streaming server that the each of the plurality of instances of the application for the plurality of users has been launched, wherein the cloud based streaming server supports the multi-player session.

13. The non-transitory computer-readable medium of claim 11, wherein the program instructions for launching the corresponding local instance of the application includes:
program instructions for determining that the application is installed on a first local device of a first user, wherein the first local device is selected for participation by the first user in the metaverse; and
program instructions for launching a first local instance of the application on the first local device for first participation in the metaverse by the first user.

14. The non-transitory computer-readable medium of claim 11, wherein the program instructions for launching the corresponding cloud instance of the application includes:
program instructions for determining that the application is not installed on a first local device of a first user; and
program instructions for launching a first cloud instance of the application on the cloud based streaming server for first participation in the metaverse by the first user.

15. The non-transitory computer-readable medium of claim 11, wherein the application is a video game.

16. The non-transitory computer-readable medium of claim 11, further comprising:

program instructions for monitoring a plurality of applications installed on a plurality of devices available to the plurality of users.

17. A computer system comprising:

a processor;

memory coupled to the processor and having stored therein instructions that, if executed by the computer system, cause the computer system to execute a method, comprising:

receiving over a network a request to establish a multi-player session for a plurality of users to enable participation in a metaverse;

determining, via a supervisor, whether an application configured to generate the metaverse is installed on a plurality of local devices of the plurality of users selected for the participation in the metaverse by the plurality of users, wherein the supervisor is installed on a back-end server connected to a network and is configured to monitor local devices of the plurality of users and applications installed on the local devices;

responsive to the request to establish the multi-player session, automatically, by the supervisor, launching a corresponding local instance of the application on a corresponding local device when the application is determined as already installed on the corresponding local device;

automatically, by the supervisor, launching a corresponding cloud instance of the application on a cloud based streaming server when the application is not installed on the corresponding local device;

determining that each of a plurality of instances of the application for the plurality of users has been launched, wherein the each of the plurality of instances is a local instance or a cloud instance; and enabling a start of the multi-player session when the each of the plurality of instances of the application for the plurality of users has been launched.

18. The computer system of claim 17, wherein in the method the enabling the start of the multi-player session includes:

notifying the cloud based streaming server that the each of the plurality of instances of the application for the plurality of users has been launched, wherein the cloud based streaming server supports the multi-player session.

19. The computer system of claim 17, wherein in the method the launching the corresponding local instance of the application includes:

determining that the application is installed on a first local device of a first user, wherein the first local device is selected for participation by the first user in the metaverse; and launching a first local instance of the application on the first local device for first participation in the metaverse by the first user.

20. The computer system of claim 17, wherein in the method the launching the corresponding cloud instance of the application includes:

determining that the application is not installed on a first local device of a first user; and launching a first cloud instance of the application on the cloud based streaming server for first participation in the metaverse by the first user.

\* \* \* \* \*